United States Patent [19]
Trimbo et al.

[11] Patent Number: 5,766,621
[45] Date of Patent: Jun. 16, 1998

[54] SUPPORT OF PEDIATRIC PATIENTS

[75] Inventors: Susan Trimbo, Evanston; Chris Kruzel, Chicago; David A. Mark, Oak Park, all of Ill.; Jan Kruseman, Tatroz, Switzerland; Sekhar Reddy, New Medford, Conn.

[73] Assignee: Nestec, Ltd., Vevey, Switzerland

[21] Appl. No.: 866,135

[22] Filed: May 30, 1997

Related U.S. Application Data

[63] Continuation of Ser. No. 549,559, Oct. 27, 1995, Pat. No. 5,635,199.

[51] Int. Cl.$^6$ ................................................. A61K 38/01
[52] U.S. Cl. ................................ 424/439; 514/2; 514/21
[58] Field of Search ......................... 424/439; 514/2, 514/21

[56] References Cited

U.S. PATENT DOCUMENTS

| | | | |
|---|---|---|---|
| 4,112,123 | 9/1978 | Roberts | 424/439 |
| 5,221,668 | 6/1993 | Henningfield et al. | 424/439 |
| 5,232,722 | 8/1993 | Obara et al. | 424/439 |
| 5,340,603 | 8/1994 | Neylan et al. | 424/439 |
| 5,480,865 | 1/1996 | Kingham | 424/439 |
| 5,504,072 | 4/1996 | Schmidl et al. | 424/439 |
| 5,549,905 | 8/1996 | Mark et al. | 424/439 |

FOREIGN PATENT DOCUMENTS

| | | |
|---|---|---|
| 0 486 425 A2 | 10/1991 | European Pat. Off. |
| WO 94/01001 | 7/1993 | WIPO |

OTHER PUBLICATIONS

Adibi, "Amino Acid and Peptide Absorption in Human Intestine: Implications for Enteral Nutrition." Chapter 15. *Gastrointestinal*, pp. 255–263 (1983).
Adibi et al, "Impaired Jejunal Absorption Rates of Essential Amino Acids Induced by Either Dietary Caloric or Protein Deprivation in Man," *Gastroenterology*, vol. 59, No. 3, pp. 404–413 (1970).
Adibi et al, "Comparison of Free Amino Acid and Dipeptide Absorption in the Jejunum of Sprue Patients," *Gastroenterology*, vol. 67, pp. 586–591 (1974).
Alverdy et al, "Total parenteral nutrition promotes bacterial translocation from the gut," *Surgery*, vol. 104, No. 2, pp. 185–190 (1988).
Auricchio et al, "Dipeptidylaminopeptidase and Carboxypeptidase Activities of the Brush Border of Rabbit Small Intestine," *Gastroenterology*, vol. 75, pp. 1073–1079 (1978).
Birke et al, "Trophic Effect of Dietary Peptides on Mucosa in the Rat Small Bowel." *14$^{th}$ Clinical Congress Abstracts*, Abstract No. 118, vol. 14, No. 1 Supplement, p. 26S (1990).
Bounous et al, "The Prophylactic Use of an 'Elemental' Diet in Experimental Hemorrhagic Shock and Intestinal Ischemia," *Annals of Surgery*, vol. 166, No. 3, pp. 312–343 (1967).
Clintec Nutrition Company, "Peptamen Junior™ compared to Vivonex® Pediatric" Brochure (1995).
Clintec Nutrition Company, "Big News for Little Ones," Peptamen–Junior™ Product Brochure (1994).

Clintec Nutrition Company, "Clintec For Kids," Peptamen–Junior™ Product Brochure (1995).
Crampton et al, "Rates of Absorption by Rat Intestine of Pancreatic Hydrolysates of Proteins and Their Corresponding Amino Acid Mixtures," *Clinical Science*, vol. 41, pp. 409–417 (1971).
Curtis et al, "Protein Digestion and Absorption in Rats With Pancreatic Duct Occlusion," *Gastroenterology*, vol. 74, No. 6, pp. 1271–1276 (1978).
Fogel et al, "Absorptive and Digestive Function of the Jejunum After Jujunoileal Bypass for Treatment of Human Obesity," *Gastroenterology*, vol. 71, No. 5, pp. 729–733 (1976).
Fried et al, "Decrease in gastric emptying time and episodes of regurgitation in children with spastic quadriplegia fed a whey-based formula," *The Journal of Pediatrics*, vol. 120, No. 4, 569–572 (1992).
Janne et al, "Colonic Mucosal Atrophy Induced by a Liquid Elemental Diet in Rats," *Digestive Diseases*, vol. 22, No. 9, pp. 808–812 (1977).
Jones et al, "Elemental Diet Promotes Spontaneous Bacterial Translocation and Alters Mortality After Endotoxin Challenge," *Proceedings for the 45$^{th}$ Annual Sessions of the Forum on Fundamental Surgical Problems, Surgical Forum* vol. XL, pp. 20–22 (1989).
Lis et al, "Effects of dietary restriction and protein deprivation on intestinal absorption of protein digestion products in the rat," *Br. J. Nutr.*, vol. 28, pp. 443–446 (1972).
Matthews, "Intestinal absorption of peptides," *Biochemical Society Transactions*, vol. 11, pp. 808–810 (1983).
Mead Johnson, "Kindercal™" Brochure (1994).
Milla et al, "Small intestinal absorption of amino acids and a dipeptide in pancreatic insufficiency," *Gut*, vol. 24, pp. 818–824 (1983).
Morin et al, "Small Intestinal and Colonic Changes Induced by a Chemically Defined Diet," *Digestive Diseases and Sciences*, vol. 25, No. 2, pp. 123–128 (1980).
Nutricia, "Nutricion Clinica Enteral" Brochure (1993).
Nutricia Laboratories, "Nutrison Paediatric" Brochure (1993).
Ortiz et al, "Étude en nutrition entérale post–opératoire d'une solution à base de petits peptides physiologiques comparée à une solution à base d'acides aminés libres," *Gastroentérologie Clinique et Biologique*, vol. 9, No. 2, pp. 182–183 (1985).

(List continued on next page.)

*Primary Examiner*—James H. Reamer
*Attorney, Agent, or Firm*—Hill & Simpson

[57] ABSTRACT

The present invention provides a method and nutritional composition for providing nutrition to pediatric patients. The methods of the present invention are especially directed to pediatric patients recovering from moderate trauma, burns or surgery. Pursuant to the present invention, the enteral composition includes a rapidly emptying, low gastric reflux protein source comprising approximately 10% to 14% of the total calories, a carbohydrate source and a lipid source comprising a mixture of medium and long chain triglycerides, wherein at least 20% of the lipid source are medium chain triglycerides.

27 Claims, No Drawings

OTHER PUBLICATIONS

Polk et al, "Improved Growth and Disease Activity After Intermittent Administration of a Defined Formula Diet in Children With Crohn's Disease," *Journal of Parenteral and Enteral Nutrition*, vol. 16, No. 6, pp. 499–504 (1992).

Poullain et al, "Effect of Whey Proteins, Their Oligopeptide Hydrolysates and Free Amino Acid Mixtures on Growth and Nitrogen Retention in Fed and Starved Rats," *Journal or Parenteral and Enteral Nutrition*, vol. 13, No. 4, pp. 382–386 (1989).

Ross Products Division, Abbott Laboratories, "Pediasure® Complete Liquid Nutrition" Brochure (1993).

Ross Products Division, Abbott Laboratories, "Pediasure® Liquid Nutrition for Children" Brochure (1989).

Sandoz Nutrition, "Nutrodrip® Junior" Brochure (1996).

Sandoz Nutrition, "Nutrodrip® Standard" Brochure 1996).

Sandoz Nutrition, "Vivonex® Pediatric" File Cards (1994).

Sandoz Nutrition, "Vivonex Pediatric®" Sales Sheets (1994).

Shou et al, "Dietary Protein Prevents Bacterial Translocation From The Gut," *15th Clinical Congress Abstracts*, Abstract No. 75, p. 29S (1991).

Shou et al, "Dietary Manipulation of Methotrexate–Induced Enterocolitis," *Journal of Parenteral and Enteral Nutrition*, vol. 15, No. 3, pp. 307–312 (1991).

Shou et al, "Elemental Diet Impairs Macrophage Responsiveness to Endotoxin in Mice," *15th Clinical Congress Abstracts*, Abstract No. 38, p. 23S (1991).

Shou et al, "Interleukin–4 Reduces Chemically–Defined Diet (CDD) Induced Bacterial Translocation in Mice," *16th Clinical Congress Abstracts*, Abstract No. 39, p. 24S (1992).

SHS North America, "Neocate® One +" Brochure (1996).

Silk et al, "Use of a Peptide Rather Than Free Amino Acid Nitrogen Source in Chemically Defined 'Elemental' Diets," *Journal of Parenteral and Enteral Nutrition*, vol. 4, No. 6, pp. 548–555 (1980).

Silk et al, "Characterization and Nutritional Significance of Peptide Transport in Man," *Ann. Nutr. Metab.*, vol. 26, pp. 337–352 (1982).

Silk et al, "Protein digestion and amino acid and peptide absorption," *Proceedings of the Nutrition Society*, vol. 44, pp. 63–72 (1985).

Sleisenger et al, "Protein Digestion and Absorption," *Seminars in Medicine of the Beth Israel Hospital, Boston*, vol. 300, No. 12, pp. 559–663 (1979).

Smith et al, "Increased Ureagenesis and Impaired Nitrogen Use During Infusion of a Synthetic Amino Acid Formula," *The New England Journal of Medicine*, vol. 306, No. 17, pp. 1013–1018 (1982).

Teichberg et al, "Response of Rat Intestine to a Hyperosmotic Feeding," *Pediat. Res.*, vol. 12, pp. 720–725 (1978).

Vazquez et al, "Effect of starvation on amino acid and peptide transport and peptide hydrolysis in humans," *Am. J. Physiol.*, vol. 249, pp. G563–G566 (1985).

Wagner et al, "Evaluation of 'Closed' vs 'Open' Systems for the Delivery of Peptide–Based Enteral Diets," *Journal of Parenteral and Enteral Nutrition*, vol. 18, No. 5, pp. 453–456 (1994).

White et al, "Elemental Liquid Diet Does Not Facilitate Bacterial Translocation in Normal or Endotoxin–Stressed Animals," *J. Am. Coll. Nutr.*, Abstract No. 34, p. 530 (1990).

Zaloga et al, "Effect of Enteral Diets on Whole Body and Gut Growth in Unstressed Rats," *Journal of Parenteral and Enteral Nutrition*, vol. 15, pp. 42–47 (1991).

SUPPORT OF PEDIATRIC PATIENTS

This is a continuation of application Ser. No. 08/549,559, filed Oct. 27, 1995 now U.S. Pat. No. 5,635,199.

BACKGROUND OF THE INVENTION

The present invention relates generally to the treatment and nutritional support of patients. More specifically, the present invention relates to providing nutrition to pediatric patients.

The measurement of diet adequacy in patients, especially pediatric patients, is difficult. Increases in a child's weight and length only grossly reflect nutritional progress. The daily requirements for adequate nutrition are especially significant for the growing child compared with the adult. The relative need for protein, vitamins and minerals remains constant and is greater than that of adults. Moreover, requirements for various vitamins depend on the intake of calories, protein, fat, carbohydrate and specific amino acids.

While the nutritional needs of the pediatric patient differ from adult patients, in health care settings, adult nutritional formulas are the primary form of elemental nutrition currently being used for children. Naturally, adult formulas do no take into effect the known nutritional needs of the pediatric patient. These adult enteral nutritional products must be diluted to decrease concentrations of, for example, protein, sodium, chloride and the renal solute load levels recommended for children. This dilution reduces the concentrations of other needed nutrients that are often already in concentrations too low for children (i.e. calcium and phosphorous). Thus, providing a nutritional formula designed specifically for children would be advantageous.

A whole protein enteral formula sold under the trademark PEDIASURE® is currently available from Ross Laboratories for nutritional therapy of pediatric patients. PEDIASURE® contains 12% protein, 44% carbohydrates, and 44% fat. The whole protein formula has a protein composition of 82% casein and 18% whey.

Although PEDIASURE® is formulated for children, it is designed to provide nutrition for a limited population, namely 1 to 6 years old. As a result thereof, while PEDIASURE® may meet the National Academy of Sciences-National Research Council (NAS-NRC) Recommended Daily Allowances (RDAs) for children 1 to 6 years old in 1000 calories, it requires 1300 calories to meet the RDA of children ages 7 to 10 years.

Therefore, a need exists for a nutritional formula designed to meet the nutritional needs of a larger base of pediatric patients as well as pediatric patients recovering from trauma, post-surgical as well as from moderate traumatic injuries and burns.

SUMMARY OF THE INVENTION

The present invention provides a nutritional composition designed for pediatric patients. Additionally, the present invention provides a method for providing nutrition to a pediatric patient. The present invention also provides a method for providing nutrition to a pediatric patient requiring nutritional support as a result of trauma, burns, post-surgery, cerebral and the like.

In an embodiment, the present invention provides an enteral composition designed for pediatric patients. The enteral composition includes: a protein source comprising approximately 10% to 14% of the total calories; a carbohydrate source; and a lipid source comprising a mixture of medium and long chain triglycerides, wherein at least 25% of the lipid source are medium chain triglycerides.

In an embodiment, the protein source comprises casein, and whey, and in a most preferred embodiment comprises about 50% casein and 50% whey to improve the rate of gastric emptying and reduce the incidence of gastric reflux as compared to diets containing only casein or predominantly casein. The protein should also provide a rich source of cysteine and preferably contains about 0.15% of calories as cysteine (about 350 mg/1000 calories).

In an embodiment, the carbohydrate source is either maltodextrin, e.g., corn starch and sucrose. The carbohydrate source comprises approximately 40% to 60% of the total calories of the composition.

In an embodiment, the lipid source comprises approximately 30% to 40% of the total calories of the composition.

In an embodiment, long chain triglycerides of the lipid source are selected from the group consisting of soy oil, canola oil, residual milk fat, and soy lecithin.

In an embodiment, the composition further comprises an omega-3 to omega-6 fatty acid ratio of approximately 4:1 to 6:1.

Still further, in an embodiment, the composition includes at least 100% of the NAS-NRC RDA for children of all vitamins and minerals in 100 kcals.

The present invention also provides a method for providing nutrition to a pediatric patient. The method comprises the step of administering to the patient a therapeutically effective amount of a composition comprising: a protein source comprising approximately 10% to 14% of the total calories; a carbohydrate source; and a lipid source comprising a mixture of medium and long chain triglycerides. The lipid source includes an omega-3 to omega-6 fatty acid ratio of approximately 4:1 to 6:1 and medium chain triglycerides comprise at least 25% of the lipid source.

Still further, the present invention provides a method for providing nutrition to a pediatric patient with moderate needs for tissue repair recovering from trauma, burns or surgery or suffering from cerebral palsy. The method comprises the step of administering to the patient a therapeutically effective amount of an enteral composition comprising: a cysteine-rich protein source; a carbohydrate source; and a lipid source. The protein source comprises approximately 10% to 14% of the total calories of the composition. The lipid source comprises a mixture of medium and long chain triglycerides. The medium chain triglycerides make up at least 25% of the lipid source.

An advantage of the present invention is that it provides a nutritional composition that is ready-to-use, nutritionally complete, and contains proteins, lipids, carbohydrates and vitamins and minerals in proportions appropriate for children ages 1–10 years.

Moreover, an advantage of the present invention is that it provides a nutritional diet for tube and oral use designed for optimal tolerance and absorption in children ages 1–10 years.

Another advantage of the present invention is that it provides a composition including a protein source in a percentage that is adequate to support growth and moderate needs for tissue repair without imposing an undue nitrogen burden on renal function.

Furthermore, an advantage of the present invention is that it provides a composition utilizing hydrolyzed whey protein, medium chain triglycerides and maltodextrin to enhance absorption and reduce intolerance.

Yet another advantage of the present invention is that it includes beta-carotene, thereby allowing for the maintenance of plasma beta-carotene concentration in the pediatric patient.

Still another advantage of the present invention is that it possesses appropriate amounts of electrolytes including sodium, potassium and chloride without imposing an undesirable renal solute burden on kidney function.

Additional features and advantages of the present invention are described in, and will be apparent from, the detailed description of the presently preferred embodiments.

DETAILED DESCRIPTION OF THE PRESENTLY PREFERRED EMBODIMENTS

Nutritional support of hospitalized children requires prevention, recognition, and treatment of the nutritional depletion that may occur with illness. The goals of nutritional support include stabilizing metabolic state, maintaining body mass, and/or facilitating growth and promoting tissue repair in the presence of disease and/or trauma.

While nutritional deficiency diseases are unusual in our culture today, other disease states exist that alter intake, absorption or metabolism. As set forth above, certain health conditions can impair the nutrient absorption and/or reduce gastrointestinal tolerance for diets which are based on whole proteins, long-chain fatty acids and/or complex carbohydrates.

The inventors believe that the enteral diet of the present invention when administered to pediatric patients actively undergoing tissue repair and healing will provide adequate nutritional support to such patients. Specifically, the inventors believe that the use of the composition of the present invention containing specific protein, carbohydrate and fat sources as well as a source of vitamins and minerals provides an effective nutritional support for pediatric patients.

The protein source of the present invention provides approximately 10% to 14% of the total calories of the composition. In an embodiment, the protein source comprises approximately 12% of the total calories of the composition. This protein concentration chosen is adequate to support growth and moderate needs for tissue repair without imposing an undue nitrogen burden on renal function for children ages 1–10 years.

The protein source comprises a mixture of casein and whey proteins. The whey protein may be present in whole or in hydrolyzed forms. In an embodiment, the protein source comprises about 50% casein and about 50% whey protein. In an embodiment, the hydrolyzed protein source is hydrolyzed whey. The protein source of the present composition reduces the incidence of gastric reflux because gastric emptying is faster than with diets containing casein or predominantly casein. Also, whey protein serves as a rich source of the amino acid cysteine. Cysteine is a limiting amino acid for the formation of glutathione, and glutathione needs may be higher in children with infectious or inflammatory conditions. In an embodiment, the composition of the present invention contains approximately 0.15% of calories as cysteine (approximately 350 mg per 1000 calories).

Carbohydrates provide approximately 40% to 60% of the caloric content of the composition. In an embodiment, the carbohydrate source is approximately 51% of the caloric content of the composition. A number of carbohydrates can be used including maltodextrin, hydrolyzed corn starch and/or sucrose.

The lipid source includes a mixture of medium chain triglycerides (MCT) and long chain triglycerides (LCT). The lipid source of the present invention is approximately 30% to about 40% of the caloric content of the composition. In an embodiment, the lipid source of is approximately 37% of the caloric content of the composition. The lipid profile is designed to meet essential fatty acid needs (omega-3 and omega-6), and in an embodiment comprises about 12.6% of essential fatty acids based on total calories.

The lipid source includes at least 20–30% of medium chain triglycerides. In an embodiment, MCTs make up at least 25% of the lipid source.

Suitable sources of long chain triglycerides are canola oil, soy oil, residual milk fat, and soy lecithin.

The lipid profile containing such long chain triglycerides is designed to have a polyunsaturated fatty acid omega-6 (n-6) to omega-3 (n-3) ratio of approximately 4:1 to 6:1. In an embodiment, the n-6 to n-3 fatty acid ratio is approximately 5:1. Both the omega-6 and omega-3 fatty acids are provided in sufficient quantity to meet tissue growth maintenance needs. To this end, in an embodiment, the source of omega-6 fatty acids is present in a range of approximately 4–12% of the total calories. The omega-3 fatty acid source is preferably present in the range of approximately 0.8–3.0% of the total calories. In addition to the absorption/tolerance benefits of a moderate LCT content, the composition of the present invention is less likely to be immunosuppressive due to the low percentage of omega-6 fatty acids.

By way of example, and not limitation, an example of a fatty acid lipid profile that may be used in the composition of the present invention is as follows:

TABLE 1

Lipid Component For Pediatric Nutritional Composition (42.0 grams/liter)

| COMPONENT | % of Lipids | Grams/Liter |
|---|---|---|
| C6:0 | 0.6 | 0.3 |
| C8:0 | 14.0 | 5.9 |
| C10:0 | 6.7 | 2.8 |
| C12:0 | 0.3 | 0.1 |
| C14:0 | 0.4 | 0.2 |
| C16:0 | 6.4 | 2.7 |
| C18:0 | 2.2 | 0.9 |
| C20:0 | 0.5 | 0.2 |
| TOTAL SAT | 31.1 | 13.1 |
| C16:1 | 0.4 | 0.2 |
| C18:1 | 24.1 | 10.1 |
| C20:1 | 0.3 | 0.1 |
| TOTAL MONO | 24.8 | 10.4 |
| C18:2 n6 | 27.8 | 11.7 |
| C18:3 n3 | 5.7 | 2.35 |
| TOTAL POLY | 33.5 | 14.05 |
| TOTAL FA'S | 89.4 | 37.55 |
| NON-FA'S | 10.6 | 4.45 |
| TOTAL ALL | 100.0 | 42.0 |

P/S Ratio = 1.1; (Saturated includes MCT)
N6 = 27.8% of fat (22.7 g/L) 10.5% of total calories
N3 = 5.7% of fat (2.35 g/L) 2.1% of total calories
N3 to N6 Ratio – 5.0:1

| FAT SOURCE | % BY WT | % TOTAL KCAL |
|---|---|---|
| MCT | 25% | 8.7& |
| CANOLA | 24% | 9.1% |
| SOY | 43% | 16.2% |
| MILK* | 3% | 1.1% |
| SOY LECITHIN | 5% | 1.9% |
| TOTAL = | 100% | 37.0 |

*Residual milk fat (with the casein and whey protein) contributes to the total lipid content Still further, the present invention, in an embodiment, includes a specialized vitamin and mineral profile. The composition includes a source of vitamins and minerals providing at least 100% of the NAS-NRC Recommended Daily Allowance for children. The vitamin and mineral requirements are met in 1000 kcal per day because this intake is practical, achievable and easily tolerated by children ages 1-10 years, even though it is somewhat less than healthy children normally eat. Unlike prior compositions, the composition of the present invention meets NAS-NRC RDAs for children ages 1-10 years in 1000 calories. The high vitamin and mineral concentration of the present invention is of practical benefit because typical feeding regimens (e.g. 50 mL/hour for 20 hours/day) will meet all needs. However, none of the vitamin or mineral concentrations are so high that there is any risk of approaching toxic levels, even at 2000-2500 kcal per day.

In an embodiment, the composition of the present invention includes a source of beta-carotene. The inventors view beta-carotene, formerly considered only as a precursor to vitamin A, as an important nutrient with anti-oxidant properties. In an embodiment, the composition includes approximately 0.5-2.0 mg of beta-carotene per 1000 calories. This amount of beta-carotene is sufficient to maintain plasma beta-carotene concentration in the pediatric patient.

The composition of the present invention, in an embodiment, includes certain electrolyte concentrations. The electrolyte concentrations are set to meet needs without providing an undue renal solute burden on kidney function. To this end, sodium is preferably present in a range of approximately 420-500 mg/L. In an embodiment, potassium and chloride are present at ranges of approximately 1260-1380 mg/L and 1040-1120 mg/L, respectively. The renal solute load is, in an embodiment, present in a range of approximately 200-210 Mosm. In a preferred embodiment, the electrolyte concentrations of the present invention are as follows: sodium is present at 460 mg/L; potassium is present at 1320 mg/L; chloride is present at 1080 mg/L; and the renal solute load is at 205 Mosm.

The composition of the present invention is a ready-to-use enteral formulation. The composition can be used as a supplement or for total enteral nutritional support. The composition can be tube-fed to a patient, or fed by having the patient drink same. Preferably, the caloric density of the composition is 1.0 kcal/ml. Various flavorants, fibers and other additives may also be present in the compositions of this invention.

The composition of the present invention can be used for providing nutrition to a pediatric patient ages 1 to 10 years. Likewise, the composition can be used for providing nutrition to a pediatric patient recovering from surgery, burns or trauma. The diet utilizes a significant amount of whey protein, medium chain triglycerides and maltodextrin to enhance absorption and reduce intolerance.

By way of example, and not limitation, suitable compositions in accordance with this invention and that may be used pursuant to the present invention are as follows:

EXAMPLES 1-2

In accordance with this invention, new and improved pediatric enteral nutritional compositions comprise the following ingredients: protein: casein and whey; carbohydrate: maltodextrin and sucrose; lipid: canola oil, soy oil, coconut oil (MCT), residual milk fat, soy lecithin; water; vitamin A (retinol); beta-carotene; vitamin D, vitamin E; vitamin K; vitamin C; thiamine $B_1$; riboflavin $B_2$; niacin; vitamin $B_6$; folic acid; pantoth acid; vitamin $B_{12}$; biotin; choline; taurine; L-carnitine; inositol; calcium; phosphorus; magnesium; zinc; iron; copper; manganese; iodine; sodium; potassium; chloride; chromium; molybdenum; and selenium. Example 1 shows the composition which does not contain added dietary fiber. Example 2 shows the composition and contains fiber.

The composition of the present invention has the following nutrient composition (per 1000 calories):

TABLE 2

Pediatric Enteral Nutritional Compositions

| COMPOSITION (Per Liter) | UNITS | EXAMPLE 1 | EXAMPLE 2 |
|---|---|---|---|
| Cal. Density | Kcal/ml | 1.0 | 1.0 |
| Cals./Can | Calories | 250 | 250 |
| PROTEIN | G/L (% Kcal) | 30.0 (12%) | 30.0 (12%) |
| Casein | | 50% | 50% |
| Whey | | 50% | 50% |
| CARBOHYDRATE | G/L (% Kcal) | 127.5 (51%) | 127.5 (51%) |
| Maltodextrin | | 66% | 66% |
| Sucrose | | 34% | 34% |
| FIBER | G/L | 0.5 | 6.0 |
| LACTOSE CONTENT | G/L | 1.5 | 1.5 |
| "Lactose Free"[1] | | Yes | Yes |
| FAT | G/L (% Kcal) | 42.0 (37%) | 42.0 (37%) |
| % by weight | | | |
| Soy oil | | 43% | 25% |
| MCT | | 25% | 25% |
| Canola oil | | 24% | 24% |
| Soy Lecithin | | 5% | 5% |
| Residual milk fat | | 3% | 3% |
| G/L & (% of Total Kcal) | | | |
| MCT | | 10.5 (8.7%) | 10.5 (8.7%) |
| Linolenic (N6) | | 11.7 (10.5%) | 11.7 (10.5%) |
| Linoleic (N3) | | 2.35 (2.1%) | 2.35 (2.1%) |
| N6:N3 ratio | | 5.0:1 | 5.0:1 |
| OSMOLALITY | MOSM | 350 | 350 |

TABLE 2-continued

Pediatric Enteral Nutritional Compositions

| COMPOSITION (Per Liter) | UNITS | EXAMPLE 1 | EXAMPLE 2 |
|---|---|---|---|
| RENAL SOLUTE LOAD | MOSM/L | 205 | 205 |
| MCT:LCT RATIO | | 25:75 | 25:75 |
| VOLUME TO MEET OR EXCEED NAS-NRC RDA | | 1.0 L | 1.0 L |
| DENSITY | G/ML | 1.057 | 1.060 |
| WATER | ML/L | 850 (85%) | 840 (84%) |
| VISCOSITY | CP | | |
| CAL/gN | Ratio | 210:1 | 210:1 |
| NPC/gN | Ratio | 185:1 | 185:1 |

[1]"Lactose Free" defined as <0.5 grams per serving.

EXAMPLES 3–4

The new and improved pediatric nutritional compositions may be provided in storage stable, ready to use, liquid form in cans or in retort processes screw-off topped containers. Examples 3–4 show the formulations for 250 mL cans and one liter containers with respect to NAS-NRC recommended dietary allowances for children 7–10 years of age as follows:

EXAMPLE 5

Another pediatric nutritional composition of the present invention is shown in the following Example 5. Table 4 shows a comparison of the composition of Example 5 with the NAS-NRC RDAs and with a prior pediatric formulation, PEDIASURE® available from Ross Laboratories, as follows:

TABLE 3

Pediatric Nutritional Formulations in 250 mL and 1 L Containers

| NUTRITION COMPOSITION | UNITS | NAS-RC* | AMOUNT per 250 mL can | % NAS-NRC | AMOUNT per Liter | % NAS-NRC |
|---|---|---|---|---|---|---|
| Calories | KCAL | — | 250 | ** | 1000 | ** |
| Protein | G | 28.0 | 7.5 | 27 | 30.0 | 107 |
| Carbohydrate | G | — | 31.9 | ** | 127.5 | ** |
| Fat*** | G | — | 10.5 | ** | 42.0 | ** |
| Water | ML | — | 212 | ** | 850 | ** |
| Vitamin A**** | I.U. | 2330 | 600 | 26 | 2400 | 103 |
| Beta-Carotene | MG | ** | 0.25 | ** | 1.0 | ** |
| Vitamin D | I.U. | 400 | 140 | 35 | 560 | 140 |
| Vitamin E | I.U. | 7 | 7 | 100 | 28 | 400 |
| Vitamin K | MCG | ** | 7.5 | ** | 30 | ** |
| Vitamin C | MG | 45 | 25 | 55 | 100 | 220 |
| Thiamine $B_1$ | MG | 1.0 | 0.6 | 60 | 2.4 | 240 |
| Riboflavin $B_2$ | MG | 1.2 | 0.5 | 42 | 2.0 | 167 |
| Niacin | MG | 13 | 5 | 38 | 20 | 154 |
| Vitamin $B_6$ | MG | 1.4 | 0.6 | 43 | 2.4 | 171 |
| Folic Acid | MCG | 100 | 100 | 100 | 400 | 400 |
| Pantoth. Acid | MG | ** | 2.5 | ** | 10 | ** |
| Vitamin $B_{12}$ | MCG | 1.4 | 1.5 | 107 | 6 | 428 |
| Biotin | MCG | ** | 75 | ** | 300 | ** |
| Choline | MG | ** | 75 | ** | 300 | ** |
| Taurine | MG | ** | 20 | ** | 80 | ** |
| L-Carnitine | MG | ** | 10 | ** | 40 | ** |
| Inositol | MG | ** | 20 | ** | 80 | ** |
| Calcium | MG | 800 | 250 | 31 | 1000 | 125 |
| Phosphorus | MG | 800 | 200 | 25 | 800 | 100 |
| Magnesium | MG | 170 | 50 | 29 | 200 | 118 |
| Zinc | MG | 10 | 3.8 | 38 | 15 | 150 |
| Iron | MG | 10 | 3.5 | 35 | 14 | 140 |
| Copper | MG | ** | 0.25 | ** | 1.0 | ** |
| Manganese | MG | ** | 0.4 | ** | 1.5 | ** |
| Iodine | MCG | 120 | 30 | 25 | 120 | 100 |
| Sodium | MG | ** | 115 | ** | 460 | ** |
| Potassium | MG | ** | 330 | ** | 1320 | ** |
| Chloride | MG | ** | 270 | ** | 1080 | ** |
| Chromium | MCG | ** | 7.5 | ** | 30 | ** |
| Molybdenum | MCG | ** | 7.5 | ** | 30 | ** |
| Selenium | MCG | 30 | 7.5 | 25 | 30 | 100 |

*NAS-NRC recommended dietary allowances for children 7–10 years of age
** NAS-NRC RDA not established

TABLE 4

Comparison of Compositions of This Invention (Example 5) with PEDIASURE ® and NAS-NRC RDAs (Per 1000 Calories)

| NUTRIENT COMPOSITION | UNITS | PEDIASURE ® | NAS-NRC RDAs 1–3 Yrs | NAS-NRC RDAs 4–6 Yrs | NAS-NRC RDAs 7–10 Yrs | Example 5 |
|---|---|---|---|---|---|---|
| CAL DENSITY | Kcal/mL | 1.0 | ** | ** | ** | 1.0 |
| PROTEIN | G (%) | 30.0 (12%) | 16 | 24 | 28 | 30.0 (12%) |
| Casein | | 82% | | | | 50% |
| Whey | | 18% | | | | 50% |
| CARBOHYDRATE | G (%) | 109.7 (44%) | ** | ** | ** | 127.5 (51%) |
| FAT | G (%) | 49.7 (44%) | ** | ** | ** | 42.0 (37%) |
| Safflower Oil | | 50% | | | | — |
| Canola Oil | | — | | | | 24% |
| Soy Oil | | 30% | | | | 43% |
| MCT | | 20% | | | | 25% |
| Residual Milk Fat | | — | | | | 3% |
| Soy Lecithin | | 5% | | | | 5% |
| N6:N3 Ratio | | 9:1 | | | | 5:1 |
| FIBER | G | 5.0 | ** | ** | ** | 6.0 or 0.0 |
| WATER | ML | 844 | ** | ** | ** | 840 or 850 |
| VITAMIN A (RETINOL) | IU | 2570 | 1325 | 1665 | 2330 | 2400 |
| BETA-CAROTENE | MG | 0 | ** | ** | ** | 1.0 |
| VITAMIN D | IU | 510 | 400 | 400 | 400 | 560 |
| VITAMIN E | IU | 23 | 6 | 7 | 7 | 28 |
| VITAMIN K | MCG | 38 | ** | ** | ** | 30 |
| VITAMIN C | MG | 100 | 40 | 45 | 45 | 100 |
| THIAMINE $B_1$ | MG | 2.7 | 0.7 | 0.9 | 1.0 | 2.4 |
| RIBOFLAVIN $B_2$ | MG | 2.1 | 0.8 | 1.1 | 1.2 | 2.0 |
| NIACIN | MG | 17 | 9 | 12 | 13 | 20 |
| VITAMIN $B_6$ | MG | 2.6 | 1.0 | 1.1 | 1.4 | 2.4 |
| FOLIC ACID | MCG | 370 | 50 | 75 | 100 | 400 |
| PANTOTH. ACID | MG | 10 | ** | ** | ** | 10 |
| VITAMIN $B_{12}$ | MCG | 6 | 0.7 | 1.0 | 1.4 | 6 |
| BIOTIN | MCG | 320 | ** | ** | ** | 300 |
| CHOLINE | MG | 300 | ** | ** | ** | 300 |
| TAURINE | MG | 72 | ** | ** | ** | 80 |
| L-CARNITINE | MG | 17 | ** | ** | ** | 40 |
| INOSITOL | MG | 80 | ** | ** | ** | 80 |
| CALCIUM | MG | 970 | 800 | 800 | 800 | 1000 |
| PHOSPHORUS | MG | 800 | 800 | 800 | 800 | 800 |
| Ca:P | Weight | 1.21:1 | 1.00:1 | 1.00:1 | 1.00:1 | 1.25:1 |
| MAGNESIUM | MG | 200 | 80 | 120 | 170 | 200 |
| ZINC | MG | 12 | 10 | 10 | 10 | 15 |
| IRON | MG | 14 | 10 | 10 | 10 | 14 |
| COPPER | MG | 1.0 | ** | ** | ** | 1.0 |
| MANGANESE | MG | 2.5 | ** | ** | ** | 1.5 |
| IODINE | MCG | 97 | 70 | 90 | 120 | 120 |
| SODIUM | MG | 380 | ** | ** | ** | 460 |
| POTASSIUM | MG | 1310 | ** | ** | ** | 1320 |
| CHLORIDE | MG | 1010 | ** | ** | ** | 1080 |
| Na:K | Molar | 0.49:1 | ** | ** | ** | 0.59:1 |
| (Na + K)/C | Molar | 1.75 | ** | ** | ** | 1.71 |
| chromium | mcg | 30 | ** | ** | ** | 30 |
| MOLYBDENUM | MCG | 36 | ** | ** | ** | 30 |
| SELENIUM | MCG | 23 | 20 | 20 | 30 | 30 |

It will be understood that various modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An enteral composition designed for pediatric patients comprising:

a protein source comprising at least one component chosen from the group consisting of casein and whey, the protein source comprises approximately 10% to 14% of the total calories providing relatively rapid gastric emptying and reduced gastric reflux;

at least 100% of the NAS-NRC RDA of all vitamins and minerals in 1000 calories:

a carbohydrate source; and a lipid source comprising a mixture of medium and long chain triglycerides, wherein at least 20% of the lipid source are medium chain triglycerides.

2. The composition of claim 1 wherein the protein component comprises about 50% casein and about 50% intact or hydrolyzed whey.

3. The composition of claim 1 further comprising a source of beta-carotene.

4. The composition of claim 1 wherein the carbohydrate component is sucrose and maltodextrin or corn starch.

5. The composition of claim 1 wherein the long chain triglycerides are selected from the group consisting of soy oil, canola oil, residual milk fat, and soy lecithin.

6. The composition of claim 1 further comprising an omega-6 to omega-3 fatty acid ratio of approximately 4:1 to 6:1.

7. The composition of claim 1 further comprising omega-6 fatty acids present in an amount of approximately 10.5% of total calories and omega-3 fatty acids present in an amount of about 2.1% of total calories.

8. A method for providing nutrition to a pediatric patient comprising the step of administering to the patient a therapeutically effective amount of a composition comprising:

a protein source comprising approximately 10% to 14% of the total calories;

a carbohydrate source comprising at least 40% of the total calories; and a lipid source comprising at least 30% of the total calories including a mixture of medium and long chain triglycerides, wherein at least 20% of the lipid source are medium chain triglycerides.

9. The method of claim 8 wherein the protein source comprises casein and intact or hydrolyzed whey.

10. The method of claim 8 wherein the lipid component comprises approximately 37% of the total calories.

11. The method of claim 8 further comprising a source of beta-carotene.

12. The method of claim 8 further comprising at least 100% of the NAS-NRC RDA of all vitamins and minerals in 1000 calories.

13. The method of claim 8 further comprising omega-6 fatty acids present in an amount of approximately 10.5% of the total calories and omega-3 fatty acids present in an amount of approximately 2.1% of the total calories.

14. A method for providing nutrition to a pediatric patient recovering from moderate trauma, burns or surgery comprising the step of administering to the patient a therapeutically effective amount of a composition comprising:

a protein source comprising at least one protein source chosen from the group consisting of casein and whey and comprises approximately 10% to 14% of the total calories;

a carbohydrate source comprising at least 40% of the total calories; and a lipid source comprising at least 30% of the total calories including a mixture of medium and long chain triglycerides, wherein at least 20% of the lipid source are medium chain triglycerides.

15. The method of claim 14 wherein the protein source comprises about 50% casein and about 50% intact or hydrolyzed whey.

16. The method of claim 14 further comprising an omega-6 to omega-3 fatty acid ratio of approximately 4:1 to 6:1.

17. The method of claim 14 further comprising a source of beta-carotene.

18. The method of claim 14 further comprising at least 100% of the NAS-NRC RDA of all vitamins and minerals in calories.

19. The method of claim 14 further comprising omega-6 fatty acids present in an amount of approximately 10.5% of the total calories and omega-3 fatty acids present in an amount of approximately 2.1% of the total calories.

20. An enteral composition designed for pediatric patients comprising:

a protein source comprising hydrolyzed whey protein, the protein source providing approximately 10% to about 14% of total calories, relatively rapid gastric emptying and reduced gastric reflux;

a carbohydrate source providing at least 40% of total calories;

a lipid source providing at least 30% of total calories, the lipid source comprising a mixture of medium and long chain triglycerides and having an omega-6 to omega-3 fatty acid ratio of about 4:1 to about 6: 1, wherein at least 20% by weight of the lipid source are medium chain triglycerides; and at least 100% of the NAS-NRC RDA of all vitamins and minerals in 1000 calories.

21. The composition of claim 20 further comprising a source of beta-carotene.

22. The composition of claim 20 wherein the carbohydrate source is selected from the group consisting of sucrose, maltodextrin, and corn starch.

23. The composition of claim 20 wherein the long chain triglycerides are selected from the group consisting of soy oil, canola oil, residual milk fat, and soy lecithin.

24. A method for providing nutrition to a pediatric patient comprising the step of administering to the patient a therapeutically effective amount of a composition comprising:

a protein source comprising hydrolyzed whey protein, the protein source providing approximately 10% to about 14% of total calories, relatively rapid gastric emptying and reduced gastric reflux;

a carbohydrate source providing at least 40% of total calories;

a lipid source providing at least 30% of total calories, the lipid source comprising a mixture of medium and long chain triglycerides and having an omega-6 to omega-3 fatty acid ratio of about 4:1 to about 6:1, wherein at least 20% by weight of the lipid source are medium chain triglycerides; and at least 100% of the NAS-NRC RDA of all vitamins and minerals in 1000 calories.

25. The method of claim 24 wherein the composition includes a source of beta-carotene.

26. The method of claim 24 wherein the carbohydrate source is selected from the group consisting of sucrose, maltodextrin, and corn starch.

27. The method of claim 24 wherein the long chain triglycerides are selected from the group consisting of soy oil, canola oil, residual milk fat, and soy lecithin.

\* \* \* \* \*